United States Patent Office 3,697,234
Patented Oct. 10, 1972

3,697,234
PURIFICATION OF IMPURE SOLID NaCl BY COUNTER-CURRENT CONTACT WITH MOLTEN NaCl
Charles F. Bonilla, Tenafly, N.J., assignor to Barry F. Haskett, New York, N.Y., and Joan Hixon Martin, Washington, D.C., a fractional part interest to each
Filed Mar. 14, 1969, Ser. No. 807,375
Int. Cl. B01d 11/02
U.S. Cl. 23—312 AH                                    11 Claims

ABSTRACT OF THE DISCLOSURE

A process for the purification of salt and other fusible materials which comprises washing a finely ground impure material, e.g., sodium chloride, with a counter-current flow of a smaller molten stream of the same material at high purity (e.g., a portion of the purified final product of the process). The outlet temperature of the feed material is preferably kept just below the melting point of the same, the inlet temperature being selected in accordance with the impurities to be removed, such temperature being generally slightly above 720° C. in the case of sodium chloride.

---

Figure 1:
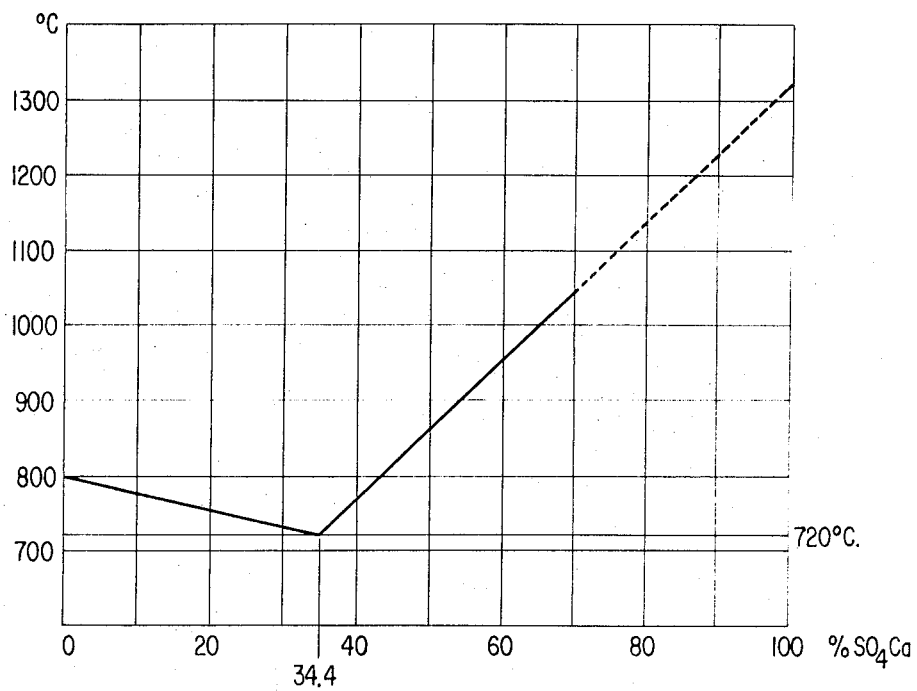

The present invention is directed to a process for the purification of salt and other fusible solids in the molten state; more particularly, the present invention is directed to a process for such purification by which the solid impure material is passed in a particulate state in counter-current flow with a molten stream of the pure material. Salt and similar materials are frequently obtained commercially in the form of an aqueous solution, generally designated as brine. In addition, salt is often utilized in various industrial processes in its aqueous solution form. Where either of these cases is true, and particularly if the salt is both obtained and utilized in the form of an aqueous solution, it is probably most economical and most convenient to carry out any required purification of the salt in the aqueous solution form, precipitating the impurities with various known reagents and filtering them away from the remaining purified salt solution. Such procedures for the purification of aqueous solutions of salt and similar materials are well known in the art and as indicated previously have their application principally where the salt is obtained and/or utilized in the form of an aqueous solution. Where the salt is obtained as a dry solid, for example, such as rock salt from a mine, or evaporator salt from a brine well followed by evaporation, and/or where the salt is to be subsequently utilized as a solid or in the molten state, such as in the electrolysis of molten sodium chloride to produce sodium and chlorine, it is disadvantageous to utilize conventional procedure requiring the formation of an aqueous solution prior to purification.

Thus, for example, in the case where the salt is obtained as a dry solid, or is to be used as a dry solid or in the molten state after purification, or is to be shipped or stored (which is preferably done as a dry solid to save weight and volume), if the conventional aqueous system purification processes were employed it would be necessary to convert the solid salt, as obtained, into an aqueous solution, purify the same, and reconvert the purified aqueous solution to a solid or molten state. This of course involves a number of process steps which would be completely unnecessary if the salt could be purified in the state in which it is obtained or in the state in which it is to be subsequently used. Thus, the utilization of conventional aqueous system purification processes in connection with salts obtained in a solid state or subsequently used in the solid or molten state is completely disadvantageous from an economic standpoint.

Accordingly, it is quite clear that if a process could be developed which would eliminate the necessity of dissolving the solid salt in water, precipitating each impurity by adding the necessary reagent, filtering out the precipitate and evaporating the water initially added, a process could be developed which could more economically and more efficiently purify salt and similar materials. Such an improved process has now been developed in accordance with the present invention.

Thus, it has been discovered that it is possible in accordance with the present invention to purify salt in a solid state, without the necessity of forming an aqueous solution thereof, by counter-current washing of the solid with a liquid phase of the same material. Thus, in accordance with the present invention the impure salt material is passed in counter-current flow with a melt of the same composition, the counter-current washing that is conducted removing impurities from the impure solid.

It is accordingly a principal object of the present invention to provide a process for purifying salt and similar materials which process eliminates inherent deficiencies and disadvantages of previously employed processes.

It is a further object of the present invention to provide a process for the purification of salt and similar materials by which it is unnecessary to convert the solid particulate salt to an aqueous solution for purification thereof.

It is still a further object of the present invention to provide a process for the purification of salt and similar materials by which the salt can be purified primarily in the solid phase, without dissolving it in water.

It is yet a further object of the present invention to provide a process for the purification of salt and similar materials by which such purification is conducted by passing the impure solid phase salt in counter-current flow with a liquid phase of the same composition, with or without partial successive melting and refreezing as it travels down through the equipment in which the process is carried out.

Still further objects and advantages of the novel process of the present invention will become more apparent from the following more detailed description.

Such objects and advantages of the novel process of the present invention are accomplished by treating the solid salt material by passing the same in counter-current flow with a molten stream of the same salt after purification.

As employed throughout the instant specification and appended claims, the expression "salt and similar materials" is meant to embrace not only conventional rock salt, e.g., sodium chloride, but other fusible solids which, in accordance with the present invention are purified by counter-current flow with a molten material of the same composition. Accordingly, as will become clear from the following description of the present invention, the process of the present invention is not only applicable to the purification of sodium chloride and closely related materials, but is applicable to the purification of any and all solid materials capable of being fused. In this regard the present invention comprises a general process for economically carrying out the purification of fusible materials which are already in a state of reasonably high purity by dissolving out and/or washing out the impurities from the particulate solid form of the crude substance by a counter-current stream of a purer molten substance of the same material.

While the present invention, as indicated above, is applicable to any and all such solid materials capable of being fused, the present invention is herein particularly intended to be adapted to the purification of solid sodium chloride, e.g., sodium chloride produced as a dry solid, either as rock salt from a mine, or evaporator salt from a brine well.

Rock salt, as commercially available, varies considerably in composition, depending on its origin and methods of handling and processing; however, most rock salt contains calcium sulphate as an impurity in an amount of one percent or more with smaller percentages of calcium chloride and magnesium chloride, minor amounts of water-insoluble materials and still smaller amounts of other miscellaneous impurities. Likewise, evaporator salt produced from a brine well will have similar impurities but generally in smaller concentrations. Such impurities present even only in minor amounts in the impure starting material generally have deleterious effects on the salt product or the process in which the salt is to be utilized. Thus, for example, if magnesium is present in a fused electrolyte employed in an electrolysis process, the magnesium will tend to deposit at the cathode as an impurity along with the cation, e.g., sodium. Similarly, sulphate and other oxygen-containing anions will be discharged at the anode, tending to oxidize or otherwise damage the same. In aqueous electrolysis processes employing diaphragm cells, for example, the calcium sulphate present as an impurity in the salt tends to plug the diaphragm thereby decreasing its permeability and increasing its electrical resistance. Accordingly, for such electrolytic processes, i.e., whether empolying a fused electrolyte or an electrolytic solution, as well as for other commercial processes employing salt and similar materials it is desirable and in fact necessary to decrease the amounts of the significant impurities to the minimum or optimum level, taking into account the cost of purification and the economic advantages thereof.

As indicated previously, the process of the present invention is one which is generally applicable to the purification of salt and similar materials which are already in a state of reasonably high purity. Thus, for example, in accordance with the process of the present invention, the impurities found within the starting material are generally not present in an amount greater than about ten percent by weight based on the initial material. In accordance with the present invention, however, such impurities can be reduced to a total amount of 0.1% or less, through the counter-current contact of the impure solid salt or similar material with a purer molten stream of the same material, obtained as the product in the same process.

The operation of the process of the present invention can be described by reference to the types of impurities which may be found in rock salt, this material being described for exemplary purposes.

Some of the impurities found in rock salt are insoluble in the molten salt. Such impurities, for example are silica and alumina. When present in the salt purified in accordance with the present invention, such impurities will merely settle out of the salt when it is melted at the end of the process, due to their greater density.

Other impurities dissolve very substantially in the molten salt and these impurities cannot be removed merely by total melting. One type of such impurities which is soluble in the molten salt is exemplified by calcium sulphate, a material which is soluble in the liquid phase but not in the solid. Calcium sulphate in small percentages therefore forms a liquid melt with the molten salt at all temperatures above the eutectic temperature of 720° C. This may be seen from the phase diagram of the sodium chloride/calcium sulphate system, FIG. 1.

As seen from FIG. 1, the eutectic composition contains approximately 34.4% by weight calcium sulphate and 65.6% by weight sodium chloride, the pure sodium chloride melting at 804° C., or approximately 800° C. As indicated previously, the solubility of calcium sulphate in the solid sodium chloride crystals between 720 and 800° C. is very small, although there is substantial solubility in the melt.

Figure 2:
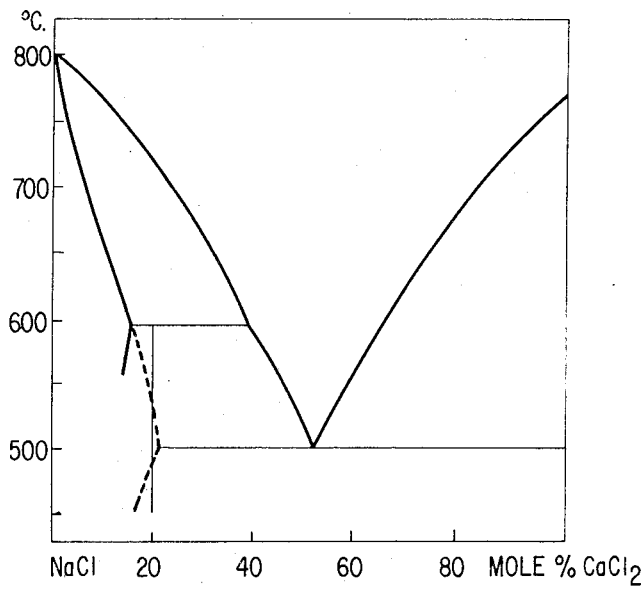

A further type of impurity which may be present in rock salt is one which is soluble in both the liquid and solid phases. Such an impurity is represented by calcium chloride. In this regard, FIG. 2 illustrates the phase diagram for a system of sodium chloride and calcium chloride. As seen in the phase diagram of FIG. 2, the solid compound $CaCl_2$-$4NaCl$ is formed at 594° C. and lower. As the temperature is raised, the solid phase dissolves calcium chloride to a decreasing extent, until at 800° C. the solubility of calcium chloride in the solid sodium chloride has decreased to zero.

While these impurities have been illustrated as representative of those in rock salt, it should be emphasized that the behavior of such types of impurities as represented above encompasses the behavior of practically any or all impurities which may be present in the impure salt. Thus, the impurities discussed above encompass those which are insoluble in the salt melt, those which are soluble only in the liquid melt, and those which are soluble in both the solid and melt phases. Again, while the impurities mentioned above are exemplary, the behavior of such impurities generally encompasses all impurities found within the initial starting material.

As indicated previously, the process of the present invention relates to a method of washing the impurities that are in an impure salt starting material, e.g., commercial sodium chloride, from around and within the solid salt crystals, by passing the solid slat in counter-current flow with a molten stream of the same salt in a purer state. Thus, whether the impurities are dissolved in the solid salt phase, or merely mixed with it, such impurities are removed from the solid salt by the counter-current contacting therewith with the molten stream of the salt material. This is additionally true since any impurity in the flowing molten stream of salt will be eliminated or thrown out as a separate solid residue.

Primarily, the process of the present invention comprises feeding a finely ground salt into a counter-contacting device at its upper and colder end, normally operated somewhat above 720° C. This temperature is selected based upon the purification of sodium chloride containing those impurities specified above, particularly calcium sulphate. It is to be noted, however that this inlet temperature need not be rigidly maintained and slightly lower or higher temperatures can be utilized where desired for particular purposes. In this regard, depending upon the salt that is being purified and the type and amount of impurities encountered, the inlet temperature of the counter-current contacting device should be maintained at a temperature from about 650° to 750° C., slightly higher than the melting point of the mixture of salt and impurities which it is desired to discharge as the waste product of the process, although, as noted above, an initial temperature slightly above 720° C. is preferred.

At the end of the counter-current contacting device, e.g., a column allowing the counter-current flow of the solid particulate salt more or less vertically downwards and the molten stream of salt counter-currently upwards, the liquid washing stream, which would consist mainly of the salt, e.g., sodium chloride, but would also contain the impurities from the crude particulate salt in a much more concentrated form, could be poured off as a waste stream. Such a stream, however, could possibly be utilized economically in some other type of process, such as, for example, an aqueous purification process to recover the discarded salt, e.g., sodium chloride.

In accordance with the process of the present invention, the solid phase of the salt progresses through the column in continuous or intermittent contact with the molten stream flowing counter-current thereto, until it reaches the exit or pure end of the counter-current contacting device.

The salt exit end or pure end of the counter-current contacting apparatus, requires that the temperature there be maintained slightly below the melting point of the pure salt. In the case of sodium chloride, this temperature is 800° C. If the temperature of the bottom exit of this counter-current contacting apparatus is maintained just below the melting point the purified salt leaves the apparatus in the form of solid crystals wetted with molten salt. The purified salt crystals are thereafter melted, a minor fraction of the pure molten salt being returned to the apparatus as a molten reflux stream. This melting of the purified salt in accordance with the process of the present invention is generally conducted in a heated section immediately after the salt exits the counter-current flow portion of the contacting apparatus but within the same column.

As indicated previously, only a minor fraction of the purified salt need be returned to the system in counter-current flow with the impure particulate salt to act as a medium for dissolving and washing away the soluble impurities in the purification reaction. Generally, from about three percent to about ten percent by weight of the purified salt is returned to the apparatus as a molten stream in counter-current flow with further impure salt material.

While it has been indicated above that after the purified salt exits that portion of the apparatus in which the counter-current contact is achieved, the same is melted, with a portion of the melt being returned to the contacting portion of the apparatus as a reflux, it is of course obvious that instead of melting the entire purified salt, only a small portion need be melted, that portion being returned as a reflux to the counter-current contacting apparatus. Such a partial melting of the purified salt might be preferred in a case where the sodium chloride, or similar salt is not to be later used in the molten form but can be advantageously employed or stored as a solid.

In accordance with the present invention, as indicated previously, as the reflux stream of molten salt passes the impure particulate salt in counter-current flow, the reflux stream progressively dissolves out or melts and washes out the impurities found in the crystals of the particulate solid. This is true of course even though the concentration of the impurities in the reflux stream increases with increasing contact with the impure salt material.

As indicated previously, the inlet and outlet temperatures defined above are only exemplary of those employed in conjunction with a system of sodium chloride containing calcium sulphate as a principal impurity. Thus, as indicated previously, both the salt inlet or top temperature and the salt outlet or bottom temperature of the counter-current contacting apparatus can be modified in accordance with the salt to be purified and the amount and nature of the impurities found within the impure starting material. Thus, with other solid impurities than clacium sulphate present, which further depress the eutectic temperature, such temperatures may be modified. Particularly, the top temperature of 720° C. could be decreased somewhat. It is also desirable under some operating circumstances to use a temperature substantially higher than 720° C. at the cold end and/or slightly higher than 800° C. at the hot end (though below 804° C., the exact melting point of pure salt) to increase the capacity of the salt-purifying column. For the purposes of the present invention, it is only necessary for the temperature at the top of the column that it be such that the impurities within the impure salt can be dissolved by the molten stream of salt without this stream being uneconomically concentrated in salt. Thus, as an illustration for the case, in which $CaSO_4$ is the main soluble impurity, the top temperature should be set so that it corresponds on FIG. 1 to the desired percent of $CaSO_4$ in the stream of salt being discarded. Thus, if it is desired to employ a tall and efficient column, a higher percent $CaSO_4$ can be achieved in the discarded salt stream, and a temperature only slightly above 720° C. is required. But, if to achieved higher product purity or capacity, or to require a shorter column it is decided that the discarded salt be substantially higher in salt content than the eutectic composition (34.4% $CaSO_4$), a correspondingly higher temperature, as given by the left hand oblique line, is required. Thus, if the salt is to be discarded with 20% $CaSO_4$, the top temperature should be regulated at approximately 755° C. as read from FIG. 1.

Similarly, the outlet temperature should be slightly lower than the temperature at which the pure salt melts, so that the purified product is in the form of a solid as it leaves the lowest contact region of the molten salt and the particulate salt at the bottom of the column. In actual operation of such a purification column the temperature at intermediate levels will be the initial freezing point of the liquid stream at that point, as given by FIG. 1 for $CaSO_4$ as the impurity or FIG. 2 for $MgCl_2$. Thus, gradual increase in temperature occurs over the length of the counter-current contacting apparatus going from the top to the bottom.

To achieve optimum yields in accordance with the process of the present invention and to provide as high an efficiency as possible, it may be necesary to provide plural stages (or discrete contacting chambers) in the counter-current contacting apparatus. This, however, may be done in any suitable manner well known in the art of contacting solid and liquid materials through counter-current flow.

Utilizing sodium chloride as an example, it is of course obvious that for the normal sequence of stages it is possible to take advantage of the difference in density of the solid sodium chloride and molten sodium chloride. In this regard, solid sodium chloride has a density of approximately 1.9 grams per cubic centimeter at 800° C. and molten sodium chloride has a density of approximately 1.55 grams per cubic centimeter at this same temperature. In view of this difference in density, it is possible to utilize a vertical tower in which the impure salt, i.e., rock salt, is introduced in finely ground form at the top of a column, the finely ground salt settling down through a rising molten salt stream. Such a free setting of the finely ground salt through a rising stream of molten salt may not be particularly advantageous, for example, where it is desired to employ a large number of equivalent stages to increase the efficiency of the purification process. Thus, due to the large number of equivalent stages that may be desired, free settling of the solid particles may not be as desirable as a slow hindered settling in the form of a fairly dense, almost packed, bed of particles.

Such a system, of course, can be achieved in a number of ways well known in the art. The descending solid particles could be maintained in a slightly fluidized form by super-imposing pulsation on the upward flow of salt material, or by the utilization of slowly rotating blades around a central axis of a column. Such agitation would preferably be sufficiently gentle that the particles still settle in "plug flow," with adjacent particles not moving significantly with respect to each other as they descend in the column. Such a compact settling bed is generally necessary in order to minimize local or small scale short-circuiting by some of the particles as they descend downwards, or some of the liquid going upwards, faster than the rest of the particles or liquid respectively. It is also advantageous to use such a system to prevent a large scale short-circuiting due to a major instability phenomenon, namely, natural convection or circulation of the contents over a major section of the column due to a lower density of the liquid and solid phases at the hotter bottom end of the column with respect to the colder top of the column.

An alternative arrangement of apparatus which could be employed in accordance with the process of the present invention could employ actual stages with down flow of the solid particulate impure salt from one stage or step to another. Such apparatus is well known in the art of counter-current contact of solid materials and liquid solvents. In such a case, the solid material is slowly fed downward from one stage or step to the next after suitable contact time with the liquid in each stage. In accordance with this type of system, pure counter-current flow is not obtained on each stage, but rather a simple mixing followed by separation. However, by having a substantial number of stages connected in counter-current arrangement with respect to the solid and liquid streams, a similar effect is obtained as is obtained in a long, purely counter-current column. Accordingly, in connection with the present invention, the term "counter-current" is meant not only to embrace the pure counter-current flow of solid and liquid materials, but also this type of system wherein counter-current flow as a whole is achieved by separate zones of contact of solid and liquid material, interconnected in a counter-current manner.

Generally, in this type of apparatus separated into a large number of different steps or stages, movement of the solid material and the liquid material between the various steps or stages is accomplished through holes or channels located on plates dividing the column. Natural convection of the liquid phase between stages, thereby by-passing stages, is prevented by having the holes and channels between the stages quite small, the dimensions of the holes and channels being only sufficient to readily accommodate the solid and liquid streams moving a counter-current flow. Alternatively, as with conventional apparatus employed for the counter-current contact of solid and liquid materials, small separate orifices may be utilized for the solid and liquid streams between succesive stages.

A further type of system which could be employed in accordance with the process of the present invention is one wherein the low temperature end of the purification column is at a lower elevation than the high temperature end. In accordance with such a system, there is no tendency for natural convection or circulation of the liquid due to temperature gradient, and thus no tendency for the liquid stream to short-circuit stages or sections of the purifying column on either a small local scale or a larger scale. Such an apparatus well known in the art could employ, for example, a vertical or an oblique column, with a suitable slowly rotating helical screw or mechanical or pulsing feeder for the solid stream of impure material.

Again, it is pointed out that all such systems are well known in the art of counter-current contacting of solid and liquid materials and the particular apparatus utilized is not an essential feature of the present invention, it being necessary that the system utilized only be that which can effectively allow the necessary counter-current contact of impure solid salt and molten salt materials.

In accordance with the present invention, the process for purifying the impure salt starting material may be conducted in a column as above described in which the temperatures at the top and bottom are controlled within the limits previously indicated and the intermediate temperatures also controlled to intermediate values, as desired. However, it is possible in accordance with the present invention, to operate without controlling the intermediate temperatures, provided that the column is maintained substantially adiabatic, that is, heat loss or gain by intermediate sections of the column are kept small, this being done by thermal insulation for example, with external heating approximately sufficient to make up the heat loss to the atmosphere. It has been found in accordance with the present invention, that if the column is operated substantially adiabatically, the initial reflux of pure liquid salt, where it is first put into contact with the solid salt stream, needs to be slightly larger than the stream of impure salt that is discarded at the other end of the process. For example, if the waste stream discarded is to contain approximately 10% of the salt in the feed, a heat balance over an adiabatic column indicates that the initial reflux stream needs to be approximately 20% of the rock salt feed. This method of operation will, in most cases, be the most convenient manner, as it simplifies the temperature control system for the column.

An alternate method of operation of the counter-current column may be desirable if the impurities in the impure salt feed do not readily diffuse and dissolve into the liquid stream. This method consists of applying, alternately, more heat and less heat than the heat losses to successive sections of the column. Thus, in one section the temperature may rise close to 790° C., for example, and in the next it may fall to close to 740° C., for example. In the first-mentioned section the melting of impurities jointly with some salt is carried out, and in the next section salt alone, or fairly pure salt, will recrystallize on crystals of salt remaining undissolved from the prior section.

Such distribution of successive higher and lower temperatures can be achieved by alternate close and more distant spacing of turns of heating wire on the outside of the column. It could also be achieved by passing alternating current lengthwise along the column, and installing spaced non-conducting rings in the column; where a ring is located the current density and the temperature are higher, and between the rings they are lower. The use of resistive heating of the molten salt by an axial current has another advantage: it can be used to regulate the volume of solid crystals in the fused melt of counter-currently flowing streams. The reason for this is that the solid crystals have a negligible electrical conductivity. Thus, if at a given location in the column the volume fraction of salt crystals is higher than desired the current density in the liquid phase is higher than normal, and the rate of heating per unit column length is increased, melting some of the crystals. Similarly, if the volume fraction of salt crystals is lower than desired the current density will be decreased, heating will decrease, and crystals present will grow by the freezing of some sodium chloride on to them. The actual current passed through the column is adjusted to yield the average amount of heating needed to keep the column in the desired temperature range. Alternating current is employed rather than direct current so that there will not be electrolysis of the salt at the electrical connections at both ends of the column, and the inconvenience of chlorine and sodium generation in this purifying column.

From FIG. 1, it is seen that the waste liquid stream should analyze at least 65.6% sodium chloride when sodium chloride is employed as the salt material. Thus, it is evident that the minimum amount of sodium chloride that must be discarded by the process of the present invention will be of the order of magnitude of twice the amount of the total impurities. In actuality, a still larger amount of sodium chloride discarded will yield the most economical operation of the instant process. A figure of the order of 10% is thus commercially reasonable when the impurities total some 1% to 2%, by weight. In actuality, operation is usually conducted with the discarding of sodium chloride within the order of 5% to 20% by weight.

As indicated previously, the above description of the process of the present invention has been given primarily with respect to sodium chloride as an example. The process of the present invention is applicable, however, to any and all fusible materials. Examples of other salts and similar materials which can be advantageously purified in accordance with the process of the present invention include, for example: potassium chloride, calcium chloride, magnesium chloride, sodium nitrate, sulfur, etc. If necessary to prevent dissociation of the substance being purified the column can be kept under pressure.

The process of the present invention will now be described by reference to the following specific examples.

EXAMPLE I

Using a vertical column divided into a multiplicity of stages or steps of counter-current flow apparatus, finely ground impure rock salt was purified by passing the same in countercurrent flow and contact with a stream of pure molten sodium chloride.

The rock salt was introduced into the top of the vertical column maintained at a temperature of approximately 725° C., this being the cold end of the counter-current apparatus. Between the cold end of the counter-current apparatus maintained at approximately 725° C. there was approximately eight feet of vertical contact space between the outlet or hot end maintained at about 800° C. just below the temperature at which the pure sodium chloride melts.

At the inlet end a pure stream of molten sodium chloride was passed in counter-current flow with the descending solid particulate impure rock salt. The intermediate temperature was not maintained, the temperature gradient being that which was naturally maintained through the contact of the impure rock salt introduced at the inlet at 725° C. and the pure molten sodium chloride introduced at the outlet.

The initial impure rock salt utilized in the purification process was one which contained approximately 4% impurities, the greatest impurity being calcium sulphate. An analysis of the product obtained at the outlet of the counter-current contacting apparatus, i.e., the purified solid particulate rock salt, found the same to contain approximately 0.1% impurities.

In conducting this process, the rock salt stream after issuing at the outlet end of the counter-current contacting apparatus into the bottom region of the column was totally melted and a small portion was not removed. This was forced to return to the counter-current contacting region of the apparatus to re-supply the molten sodium chloride stream. The amount of purified rock salt so melted and returned, comprised 20% by weight of the purified material. This melting and recycling of 20% by weight of the molten purified material, i.e. molten sodium chloride containing less than 0.1% by weight impurities was sufficient to maintain the counter-current purification process, i.e., the amount of pure molten material required for the purification of the impure rock salt, being 20% by weight based upon the weight of the impure starting material.

EXAMPLE II

When Example I is repeated, except that the initial starting material contains calcium chloride as the principal impurtiy at a concentration of approximately 2% by weight, the purified salt contained approximately 0.2% of calcium chloride, and such starting material is contacted in the same apparatus and in a similar manner with a pure stream of the same molten material, a similar purification effect is achieved. Thus where the initial material contains up to 10% impurities, this can be reduced to an amount of less than 1% by the countercurrent contact of the solid particulate impure starting material with a molten stream of the same material.

In all cases where this process was practiced, the inlet temperature was maintained between 650° and 750° C. and the outlet temperature was maintained just below the melting point of the pure material.

I claim:
1. A process for the purification of sodium chloride which comprises:
   (a) introducing impure solid particulate sodium chloride to the inlet end of apparatus adapted to allow counter-current contact of solid and liquid phases;
   (b) allowing said solid particulate sodium chloride to pass in counter-current contact with a pure molten stream of sodium chloride; and
   (c) withdrawing purified solid particulate sodium chloride from the outlet end of said apparatus.
2. The process of claim 1 wherein said apparatus comprises a column having a multiplicity of separate stages.
3. The process of claim 1 wherein the temperature at the inlet end of said apparatus is maintained at a temperature within the range of 650°–750° C.
4. The process of claim 3 wherein the temperature at the outlet end is maintained at a temperature slightly below that at which the pure solid sodium chloride melts.
5. The process of claim 1 further including (d) subsequently melting said purified solid particulate sodium chloride and returning a small fraction thereof to said apparatus as the molten phase.
6. The process of claim 5 wherein the entire purified solid particulate sodium chloride is melted.
7. The process of claim 5 wherein only that amount of said solid particulate sodium chloride to be returned to said apparatus as the molten phase is melted.
8. The process of claim 5 wherein said melted sodium chloride returned to said apparatus as the molten phase constitutes 5%–20% by weight of said solid particulate sodium chloride.
9. The process of claim 5 wherein said apparatus comprises a column having a multiplicity of separate stages.
10. The process of claim 5 wherein the temperature at the inlet end of said apparatus is maintained at a temperature within the range of 650°–750° C.
11. The process of claim 10 wherein the temperature at the outlet end is maintained at a temperature slightly below that at which the pure solid sodium chloride melts.

References Cited

UNITED STATES PATENTS

| | | | |
|---|---|---|---|
| 2,792,289 | 5/1957 | Wilson | 23—312 AH |
| 3,278,275 | 10/1966 | Barnard et al. | 23—270 |
| 2,940,272 | 6/1960 | Croley | 62—58 |
| 3,234,747 | 2/1966 | McMahon et al. | 62—58 |
| 3,339,372 | 9/1967 | Cottle | 62—58 |

NORMAN YUDKOFF, Primary Examiner

D. EDWARDS, Assistant Examiner

U.S. Cl. X.R.

23—89, 303, 308